United States Patent

[11] 3,583,133

| | | |
|---|---|---|
| [72] | Inventor | Ludwig Kasberger<br>Gottmadingen, Germany |
| [21] | Appl. No. | 820,057 |
| [22] | Filed | Apr. 29, 1969 |
| [45] | Patented | June 8, 1971 |
| [73] | Assignee | Maschinenfabrik Fahr Aktiengesellschaft,<br>Kreis<br>Constance, Germany |
| [32] | Priority | May 10, 1968 |
| [33] | | Germany |
| [31] | | P 17 57 459.3 |

[54] OUTRIGGER-TYPE MOWER FOR CONNECTION BEHIND A TRACTOR
2 Claims, 5 Drawing Figs.

[52] U.S. Cl. ................................................ 56/6,
56/25.4
[51] Int. Cl. .............................................. A01d 75/30
[50] Field of Search .......................................... 56/6, 7, 25,
254, 503, 268—270

[56] References Cited
UNITED STATES PATENTS
3,443,369  5/1969  Zweegers .................... 56/503X
FOREIGN PATENTS
54,828  3/1967  Germany ...................... 56/6

Primary Examiner—Louis G. Mancene
Assistant Examiner—J. A. Oliff
Attorney—Karl F. Ross ABSTRACT: Two substantially codirectional links are each connected at one end to two vertically offset locations on a mower frame. The other end of the lower link is pivoted on a vertically displaceable tractor hitch. A double-arm lever is also fulcrumed on this hitch and the other end of the upper link is pivoted on the lever's upper arm whereas its shorter lower arm is pivoted on to the lower link. An abutment is provided on the upper arm in a slotted hole in the upper link to form a lost-motion coupling. Thus, tee mower frame can oscillate about the one end of the lower link but, on raising of the hitch, the play is taken up in the lost-motion coupling and the lever is swung against a stop on the hitch to hold the mower rigidly horizontal.

PATENTED JUN 8 1971

Ludwig Kasberger
*Inventor.*

By Karl G. Ross
*Attorney*

Ludwig Kasberger
*Inventor.*

By Karl G. Ross
Attorney

OUTRIGGER-TYPE MOWER FOR CONNECTION BEHIND A TRACTOR

My present invention relates to an outrigger-type farm implement, e.g. a mowing device, for connection behind a tractor having a raisable hitch.

Outrigger-type implements which are attached to the rear of a tractor and project to one side thereof are known in the form of mowers and the like. They must be able to follow the irregularities of terrain often encountered when farming, while at the same time one must be able to lift them well off the ground for transport to and from the mowing site. To make this possible, hydraulic-mechanical linkages have been provided. The connection or support assemblies by which these implements are affixed to the tractor are often complicated in the extreme and quite expensive, adding considerably to the cost of such mowers.

It is, therefore, the general object of my present invention to provide an improved farm implement of the above-described type.

A more particular object is to provide a mowing device which follows the irregularities of terrain well and is at the same time easily lifted into a transport position.

Another object is to provide an inexpensive and simple support assembly for such a mowing device.

It is another object of the invention to provide a mower-type of implement which lies to the rear and the side of a tractor and which has an improved support assembly movable in a vertical plane perpendicular to vehicle motion and connected to the implement frame so that the latter can be lowered into the working position and raised in another position in which the grade-following motion of the implement is blocked.

I attain the above objects, in accordance with the principal features of my invention, by connecting a mower-type farm implement which has a frame member forming a vertical coupling link to a raisable hitch via a binary (two-pivot) link and a ternary (three-pivot) link. The lower ternary link is pivoted on the hitch and on the frame element of the mower while the upper binary link is pivoted on the frame element above the lower link and is connected to an upwardly extending arm of a further ternary (three-pivot) link in the form of a double-arm lever pivoted on the hitch. The lower, shorter arm of this lever is coupled via a lever-control means in the form of a simple binary link to the lower link and an abutment is provided on the hitch to limit rotation of the lever relatively thereto about its intermediate pivot which also constitutes the fulcrum for this motion-multiplying member.

According to a further feature of my invention a lost-motion coupling e.g. in the form of a pin on the upper arm engaging in a slotted hole on the upper link in the linkage formed by the upper binary link, the lower ternary link, the binary lever-control link, and the double-arm lever. Thus, in the lowered mowing position of the hitch the mower can oscillate (at least to a limited extent) about the pivot point of the lower link thereon. At the same time, due mainly to the shorter lower arm of the lever and the mechanical advantage gained therethrough, a slight of the hitch swings the lever against the abutment and locks the whole support assembly, with the mower held horizontally. In this locked position, the pin lies against the extreme end of slotted hole, which forms a stop, and the outer edge of the mower can still be lifted without the inward edge dropping, as the hitch or raisable support is elevated.

The above and other objects, features, and advantages of my present invention will be described in the following, with reference to the accompanying drawing in which.

Figure 1:
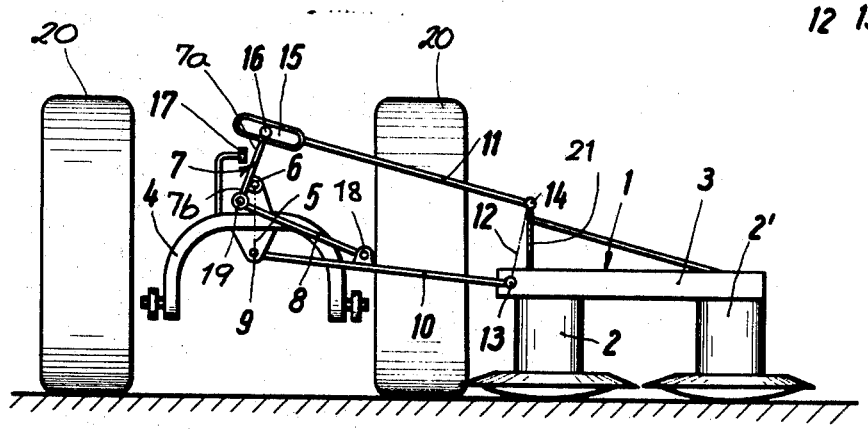
FIG. 1 is an elevational end view, largely schematic, of a mowing device in the normal mowing position mounted on a tractor.

As shown in FIG. 1 a mower 1 has two mower assemblies 2 and 2' mounted on a common frame 3. Rear wheels 20 of a tractor are shown, as is its hitch 4 which can be raised from the illustrated position.

The mower 1 is connected to the hitch 4 by a lower link 10 pivoted at 13 on the frame 3 and at 9 on a plate 5 of this hitch 4. A strut 21 fixed on the frame 3 defines a second pivot 14 above the point 13 about which an upper link 11 is pivoted.

Figure 2:
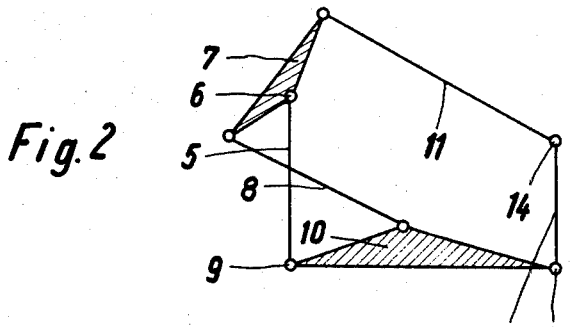
FIG. 2 is a schematic diagram of the links of the support assembly according to my invention.

As illustrated diagrammatically in FIG. 2, the hitch 4 fulcrums a lever 7 about a pivot pin 6. A lower, shorter arm 7b of this lever 7 has a pivot 19 to which a rigid binary link 8 which is pivoted toward the center of the rod 10 at 18 is connected. An upper, longer arm 7a of the lever 7 has a pivot bolt 16 received in a slotted hole 15 in the end of the link 11 away from the mower 1. An imaginary frame link 5 is formed by the hitch 4, and an imaginary coupling link 12 is formed by the frame 3 and strut 21. Elements 11 and 12 form a double-swung or double-swinging hinge assembly allowing the element 12 to swing to either side of the hinge point 14.

An abutment 17 mounted on the hitch 4 is engageable with this upper arm 7a.

Figure 3:
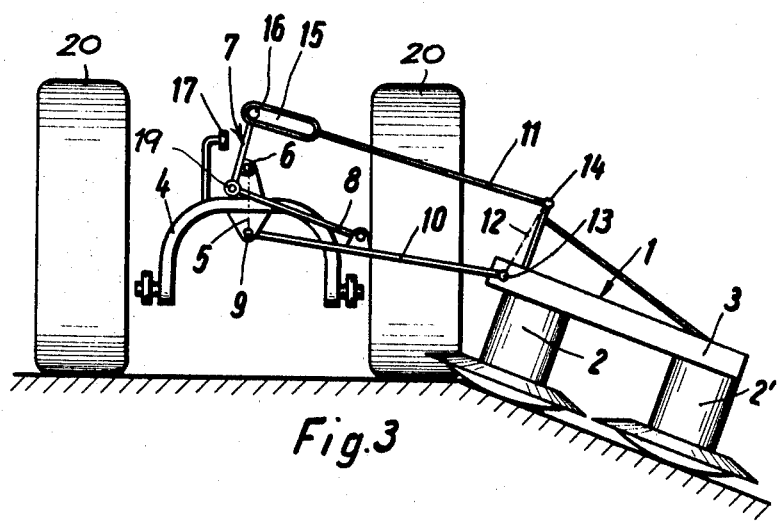
FIGS. 3 and 4 are views similar to FIG. 1, with the hitch in its lower, mowing position, showing how the mower can conform to terrain contours.

FIG. 3 shows how, with the hitch 4 in the lower position tee outer mowing assembly 2' can drop below the inner assembly 2 to follow an irregularity in the ground. As this happens the slotted hole 15 moves toward the mower 1 with the pin 16 engaging in the extreme outer end of this hole, as illustrated. In this embodiment, such a stopping of the link 11 does indeed limit downward travel of the outer assembly 2', but such an extreme dropping as shown is very rare.

Figure 4:
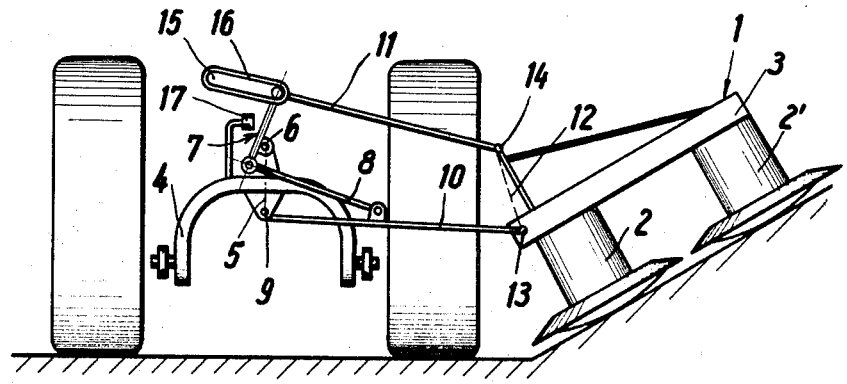

FIG. 4 shows how the pin 16 engages in the extreme inner end of the hole 15 when the outer assembly 28 is raised substantially. Once again, a limit is placed on the upward travel of this assembly 2', but this is so high that it once again is unimportant for all conceivable operating conditions.

It is worth noting that in both FIGS. 3 and 4 the upward or downward deflection of the mowing assembly 2 and, therefore, of the pivot 13, is virtually nothing due to the proximity of this pivot 13 to the wheel. Thus, since the lower link 10 is the element which determines the angular setting of the lever 7, and since this link 10 remains virtually in the same angular position itself, this lever 7 does not effectively move.

Figure 5:
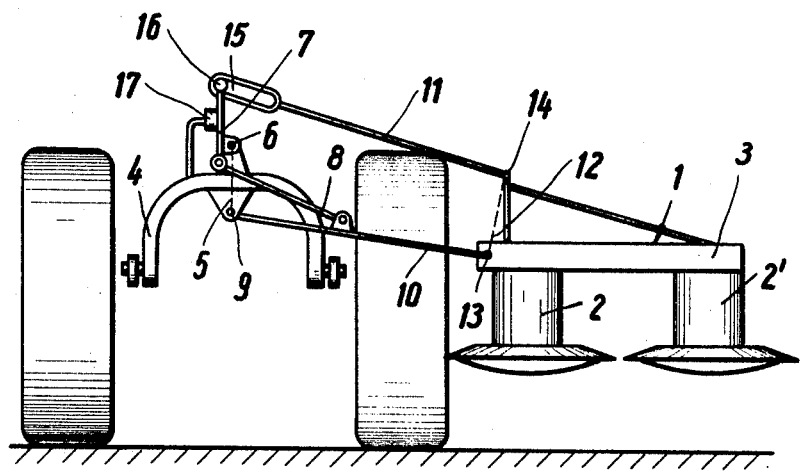
FIG. 5 is a view similar to FIG. 1 showing the hitch in its raised transport position.

FIG. 5, however, shows what happens when the hitch 4 is raised. As soon as the outer pivot 13 drops slightly, the lever 7 is rotated counterclockwise against the abutment 17. Only a minor deflection of the lower link 10 suffices, due to the mechanical advantage of the short lower arm 7b, to rotate this lever 7 against the abutment 17. This action further brings the pin 16 like a stop against the outer end of the bore 15 to prevent dropping of the outer mower assembly 2' relative to the inner assembly 2. Thus, as the hitch 4 raises it entrains the whole mower 1, with the frame 3 in a horizontal position, well clear of the ground. Should it be desirable, the slot 15 permits lifting of the outer end of the frame 3 and a vertical positioning of the frame 3.

Although here the lost-motion coupling takes the form of a slot and a pin, it is quite feasible to use other lost-motion devices (e.g. a cable) in the rigid link 11 or the lever-control link 8.

I claim:

1. An outrigger-type mower assembly for a tractor comprising a rigid mower support carrying at least one rotary mower, and a linkage coupling said support with said tractor while enabling force transmission to said support through said linkage, said linkage consisting of two three-pivot members and four two-pivot members interconnected in a kinematic chain, one of said three-pivot members being generally elongated and articulated at one of its ends to said support and at another end to a vertically shiftable portion of said tractor; the other of said three-pivot members being elongated and pivoted at a location intermediate its ends to said portion, said portion constituting a first of said two-pivot members; a second of said two-pivot members being articulated to one end of said other three-pivot member and to said support at a location spaced above the articulation of said one of said three-pivot members thereto; a third of said two-pivot members being articulated to the other end of said other three-pivot member and being pivotally connected to said one of said three-pivot members intermediate the ends thereof; and said support forming a rigid fourth of said two-pivot members between the ends of said second two-pivot member and said one of said three-pivot members, said linkage including lost-motion means and stop means for permitting limited oscillation of said support about the articulation of said one end of said one of said three-pivot members thereto.

2. The assembly defined in claim 1 wherein said vertically shiftable portion of said tractor is a hitch at the rear of said tractor and said linkage extends laterally thereof relative to the normal direction of travel of the tractor, said hitch being provided with a stop engageable with said other three-pivot member and forming said stop means, said lost-motion means including a pin-and-slot arrangement between said one end of said other three-pivot member and said second two-pivot member.